(12) United States Patent
Ono et al.

(10) Patent No.: US 9,545,951 B2
(45) Date of Patent: Jan. 17, 2017

(54) STRUCTURE FOR FRONT PART OF VEHICLE

(71) Applicant: Nissan Motor Co., Ltd., Kanagawa (JP)

(72) Inventors: Takamasa Ono, Kanagawa (JP); Kouji Hosomi, Kanagawa (JP); Tomoyuki Nakao, Novi, MI (US)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/442,994

(22) PCT Filed: Nov. 12, 2013

(86) PCT No.: PCT/JP2013/080491
§ 371 (c)(1),
(2) Date: May 14, 2015

(87) PCT Pub. No.: WO2014/077227
PCT Pub. Date: May 22, 2014

(65) Prior Publication Data
US 2015/0298742 A1    Oct. 22, 2015

(30) Foreign Application Priority Data
Nov. 16, 2012  (JP) .................................. 2012-251828

(51) Int. Cl.
*B60N 99/00*  (2006.01)
*B62D 21/15*  (2006.01)
(Continued)

(52) U.S. Cl.
CPC ............. *B62D 21/155* (2013.01); *B62D 21/11* (2013.01); *B62D 25/082* (2013.01); *B62D 25/088* (2013.01); *B60K 5/00* (2013.01)

(58) Field of Classification Search
CPC ..... B62D 21/155; B62D 21/11; B62D 25/082; B62D 25/088; B60K 5/00
See application file for complete search history.

(56) References Cited

U.S. PATENT DOCUMENTS 8,011,695 B2    9/2011 Kosaka et al.
8,025,313 B2 *  9/2011 Tanaka .................. B60G 3/202
                                                            180/311
(Continued)

FOREIGN PATENT DOCUMENTS

CN    101022987 A    8/2007
CN    101888945 A    11/2010
(Continued)

OTHER PUBLICATIONS

International Preliminary Report on Patentability issued in PCT/JP2013/080491, dated Mar. 18, 2014 (16 pages).
(Continued)

*Primary Examiner* — Lori L Lyjak
(74) *Attorney, Agent, or Firm* — Osha Liang LLP

(57) ABSTRACT

A vehicle-body front structure includes vehicle-body side structural members extending in a front-rear direction of a vehicle body at both sides of the vehicle body, a power train arranged between the vehicle-body side structural members at the both sides of the vehicle body, and a load transmission member attached to at least one of the vehicle-body side structural members or the power train with at least part of the load transmission member located outside the vehicle-body side structural members in a vehicle width direction of the vehicle body. The load transmission member is configured to transmit at least part of impact load received from an obstacle in front of the vehicle body to the vehicle body via the power train.

15 Claims, 14 Drawing Sheets

(51) Int. Cl.
    *B62D 21/11*    (2006.01)
    *B62D 25/08*    (2006.01)
    *B60K 5/00*    (2006.01)

(56) References Cited

U.S. PATENT DOCUMENTS

| | | |
|---|---|---|
| 2004/0195862 A1 | 10/2004 | Saeki |
| 2009/0230665 A1* | 9/2009 | Tamura ................ B62D 25/088 |
| | | 280/785 |
| 2009/0243271 A1* | 10/2009 | Tanaka .................... B60G 3/20 |
| | | 280/781 |
| 2010/0264637 A1 | 10/2010 | Kosaka et al. |
| 2011/0148151 A1 | 6/2011 | Abe et al. |
| 2012/0248820 A1 | 10/2012 | Yasui et al. |

FOREIGN PATENT DOCUMENTS

| | | |
|---|---|---|
| JP | 2004-123027 A | 4/2004 |
| JP | 4122887 B2 | 7/2008 |
| JP | 2008-213739 A | 9/2008 |
| JP | 2010-83455 A | 4/2010 |
| JP | 2012-214211 A | 11/2012 |
| JP | 2013-203320 A | 10/2013 |
| JP | 2013-212757 A | 10/2013 |

OTHER PUBLICATIONS

International Search Report issued in PCT/JP2013/080491, mailed Jan. 7, 2014 (2 pages).
Written Opinion issued in PCT/JP2013/080491, mailed Jan. 7, 2014 (5 pages).
International Preliminary Report on Patentability issued in PCT/JP2013/080491, dated Mar. 18, 2014 (12 pages).

* cited by examiner

STRUCTURE FOR FRONT PART OF VEHICLE

CROSS-REFERENCE TO RELATED APPLICATIONS

The present application is a nation stage application of PCT Application No. PCT/JP2013/080491 filed on Nov. 12, 2013, which claims priority from Japanese Patent Application No. 2012-251828 filed on Nov. 16, 2012, the contents of which are herein incorporated by reference.

BACKGROUND

Technical Field

The present invention relates to a vehicle-body front structure having an impact absorbing function for impact load from a vehicle-body front side.

Related Art

Patent Literature 1 describes a technique of a measure against a small overlap crash in which an obstacle collides with a vehicle from a vehicle-body front side at a position outside a side member in the vehicle width direction, the side member extending in a front-rear direction in a vehicle-body side.

The technique described in Patent Literature 1 includes a reinforcement extension extending rearward from an outer end portion of a bumper reinforcement in a vehicle width direction, the bumper reinforcement extending in the vehicle width direction at a front end of the side member. In the reinforcement extension, a protruding portion formed in a shape protruding toward the side member comes into contact with the side member in a small overlap crash and exhibits high proof stress. In this case, a stopper bracket provided in the side member receives the protruding portion and prevents the protruding portion from moving rearward.

CITATION LIST

Patent Literature

Patent Literature 1: Japanese Patent Application Publication No. 2008-213739

SUMMARY OF INVENTION

The vehicle-body front structure described above has such a risk that the reinforcement extension which is a load transmission member hinders axial crush deformation of the side member when the vehicle receives impact load from the vehicle-body front side, and it cannot be said that a performance of absorbing the impact load is sufficient.

One or more embodiments of the present invention provides a vehicle-body front structure with an improved performance of absorbing impact load from a vehicle front side.

A vehicle-body front structure includes: vehicle-body side structural members extending in a front-rear direction of a vehicle body at both sides of the vehicle body; a power train arranged between the vehicle-body side structural members at the both sides of the vehicle body; and a load transmission member attached to at least one of the vehicle-body side structural members or the power train with at least part of the load transmission member located outside the vehicle-body side structural members in a vehicle width direction of the vehicle body. The load transmission member is configured to transmit at least part of impact load received from an obstacle in front of the vehicle body to the vehicle body via the power train.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
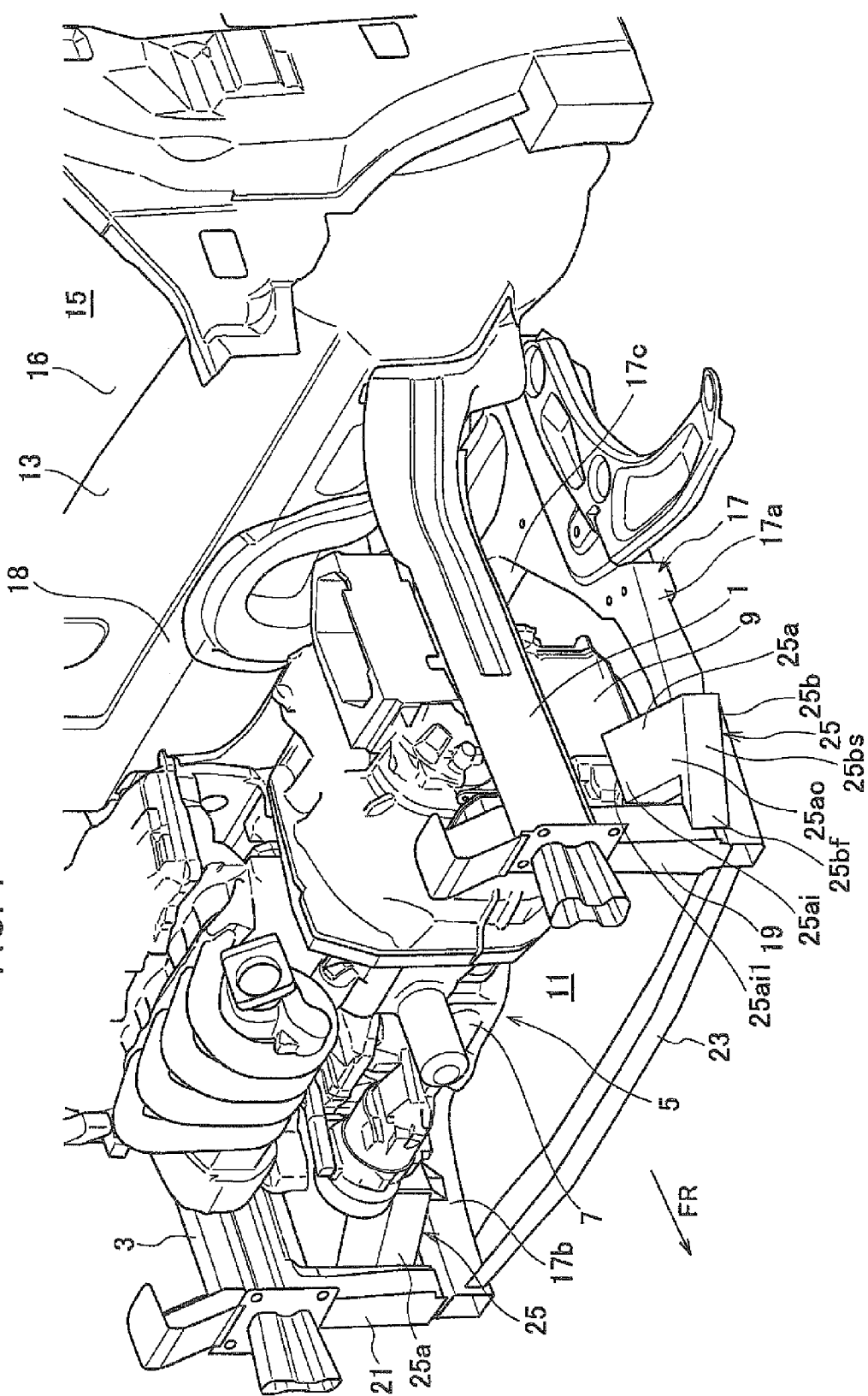
FIG. 1 is a perspective view of a vehicle-body front structure in a first embodiment of the present invention.

FIG. 1 is a perspective view showing a vehicle-body front structure in a first embodiment of the present invention, and the direction shown by the arrow FR in the drawing is a vehicle-body front side. Left and right front side members 1, 3 extending in a vehicle body front-rear direction are provided respectively in sides of the vehicle body in a vehicle width direction. A power train 5 is arranged between the left and right front side members 1, 3 while being attached to the front side members 1, 3. The front side members 1, 3 form side members and are simply referred to as side members 1, 3 in the following description.

The power train 5 includes an engine 7 and a transmission 9. A space in which the power train 5 is housed is an engine room 11. A vehicle cabin (cabin) 15 is formed on a vehicle-body rear side of the engine room 11 with a dash panel 13 provided therebetween. A floor panel 16 is provided in a bottom of the vehicle cabin 15. Moreover, a dash cross member 18 extending in a vehicle width direction is attached to a lower portion of the dash panel 13 on the engine room 11 side. Both ends of the dash cross member 18 in the vehicle width direction are bonded to the side members 1, 3.

A suspension member 17 supporting a not-illustrated front suspension is provided at a position below the left and right side members 1, 3 to surround left, right, and rear sides of the power train 5. The suspension member 17 includes: front-rear direction members 17*a*, 17*b* which are located below the left and right side members 1, 3 and which extend in the vehicle body front-rear direction; and a vehicle width direction member 17*c* which connects rear ends of the front-rear direction members 17*a*, 17*b* to each other and which extends in the vehicle width direction. The side members 1, 3 and the front-rear direction members 17*a*, 17*b* of the suspension member 17 form vehicle-body side structural members.

A front end of the front-rear direction member 17*a* and a front end of the left side member 1 are connected to each other by a vertical connecting member 19, and a front end of the front-rear direction member 17*b* and a front end of the right side member 3 are connected to each other by a vertical connecting member 21, the vertical connecting members 19, 21 extending in a vehicle body up-down direction. Front end portions of the front-rear direction members 17*a*, 17*b* are connected to each other by a radiator core lower portion 23 extending in the vehicle width direction. The radiator core lower portion 23 is a member of a lower portion of a radiator core which supports a not-illustrated radiator.

In the first embodiment, load transmission members 25 are attached to positions near the vertical connecting members 19, 21 of the left and right front-rear direction members 17*a*, 17*b* of the suspension member 17. Each of the load transmission members 25 includes a fixation portion 25*a* fixed to an upper surface of a corresponding one of the front-rear direction members 17*a*, 17*b* by bolt fastening or welding and a contact portion 25*b* formed integrally with the fixation portion 25*a* outside the fixation portion 25*a* in the vehicle width direction.

The fixation portions 25*a* protrude to both sides in the vehicle width direction with respect to the front-rear direction members 17*a*, 17*b* of the suspension member 17 and the side members 1, 3 which are the vehicle-body side structural members. In other words, at least parts of the load transmission members 25 are located outside the vehicle-body side structural members in the vehicle width direction, the vehicle-body side structural members extending in the vehicle body front-rear direction. In this case, the load transmission members 25 are inclined with respect to the vehicle body front-rear direction in such a way that protruding end portions 25*ao* protruding outward in the vehicle width direction are at positions on the vehicle-body front side of protruding end portions 25*ai* protruding inward in the vehicle width direction.

The contact portions 25*b* continuous with the protruding end portions 25*ao* protruding outward in the vehicle width direction protrude to the vehicle-body front side of the fixation portions 25*a*, and protruding end portions 25*bf* of the contact portions 25*b* are located outside the vertical connecting members 19, 21 in the vehicle width direction. In this state, the contact portions 25*b* are inclined with respect to the vehicle body front-rear direction in such a way that rearward portions of the contact portions 25*b* in the vehicle body front-rear direction are located outside frontward portions of the contact portions 25*b* in the vehicle body front-rear direction in the vehicle width direction.

The contact portions 25*b* include contact surfaces 25*bs* on outer sides in the vehicle width direction, the contact surfaces 25*bs* serving as load receiving portions configured to receive impact load when an obstacle 27 to be described later collides with the vehicle. The contact surfaces 25*bs* are inclined surfaces inclined in such a way that rearward portions of the contact surfaces 25*bs* in the vehicle body front-rear direction are located outside frontward portions of the contact surfaces 25*bs* in the vehicle body front-rear direction in the vehicle width direction to correspond to the aforementioned inclination of the contact portions 25*b*. The inclination angles θ of the inclined surfaces (contact surfaces 25*bs*) with respect to the vehicle body front-rear direction are set to be equal to or less than 45°, for example, 30° in a plan view in the vehicle body up-down direction as shown in the bottom view of FIG. 2.

Figure 2:
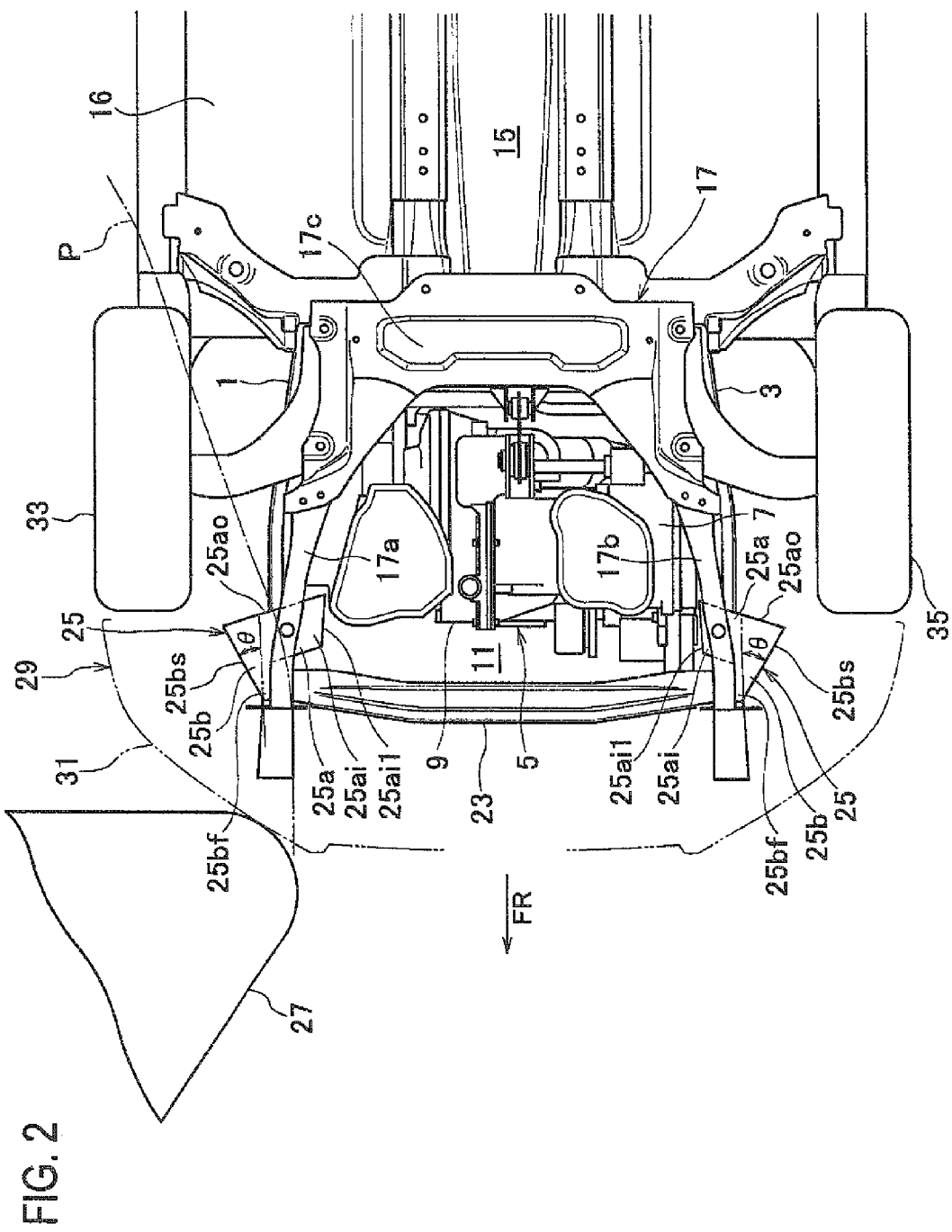
FIG. 2 is a bottom view of a vehicle body just before a crash with an obstacle in a small overlap crash in the vehicle-body front structure of FIG. 1.

End surfaces 25*ai*1 of the protruding end portions 25*ai* of the fixation portions 25*a* protruding inward in the vehicle width direction are formed of surfaces substantially parallel to the vehicle body front-rear direction and the vehicle body up-down direction, i.e. are formed of surfaces substantially orthogonal to the vehicle width direction. As shown in FIG. 2, the end surfaces 25*ai*1 of the protruding end portions 25*ai* face sides of the power train 5 in the vehicle width direction.

The load transmission members 25 as described above are located between the side member 1 and the front-rear direction members 17*a* of the suspension member 17 and between the side member 3 and the front-rear direction member 17*b* of the suspension member 17 in the vehicle body up-down direction.

Figure 3:
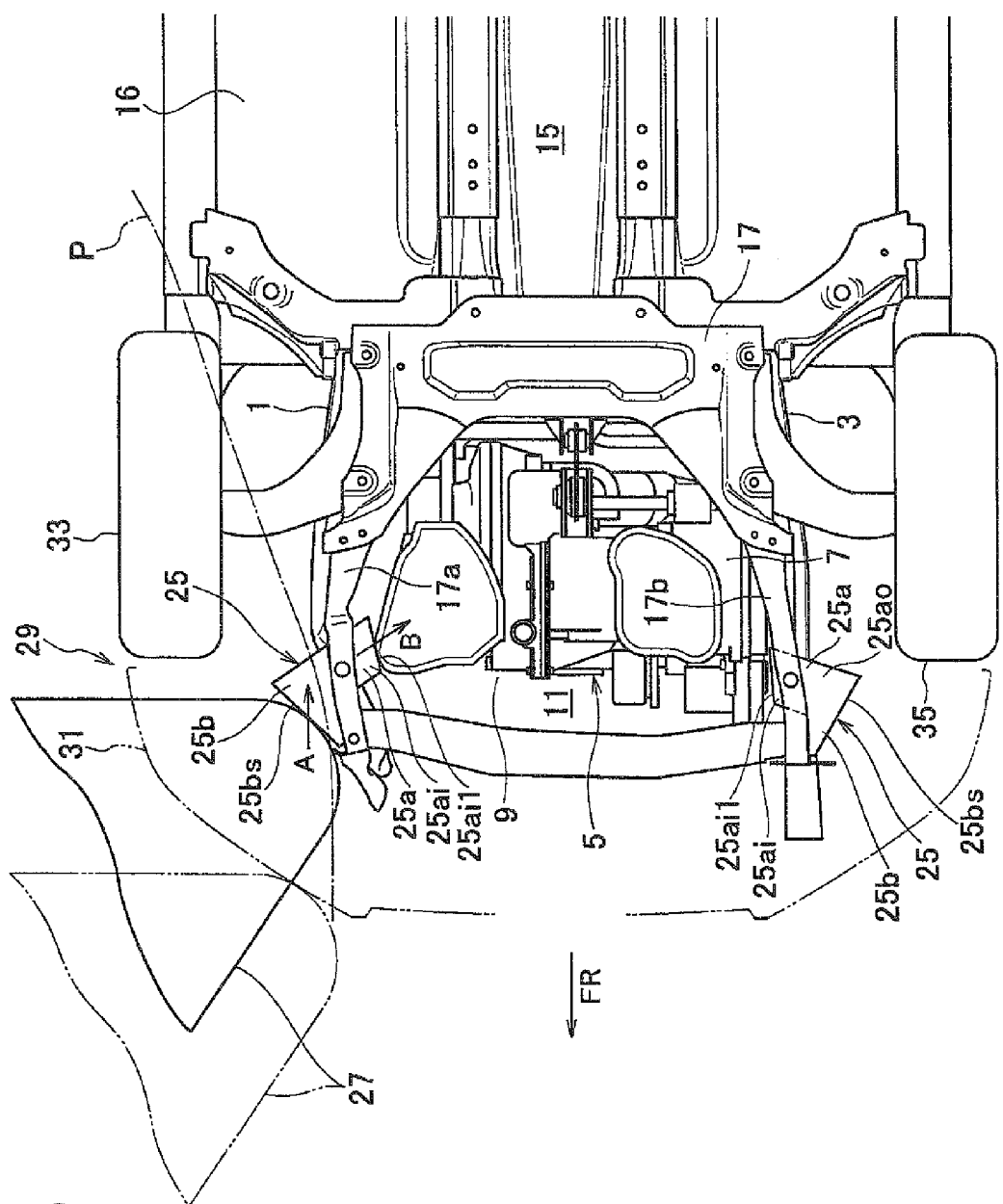
FIG. 3 is a bottom view of the vehicle body showing a state where the obstacle comes into contact with a load transmission member of a vehicle from the state of FIG. 2.

Next, description is given of a transmission path of the impact load received by a vehicle 29 when the vehicle 29 collides with the obstacle 27 shown in FIGS. 2 and 3. A crash mode in this case is a small overlap crash in which the obstacle 27 collides with the vehicle 29 from the vehicle-body front side at a position outside the side members 1, 3 in the vehicle width direction. In FIGS. 2 and 3, reference numeral 31 denotes a front bumper and reference numerals 33, 35 denote front wheels.

As shown in FIG. 2, assumed is a case where the obstacle 27 relatively approaches the vehicle 29 from, for example, front of a position outside, in the vehicle width direction, the side member 1 on the vehicle-body left side (corresponding to the left side in FIG. 2). A one-dot dash line P in FIGS. 2 and 3 shows a trajectory of movement of the vehicle 29 relative to the obstacle 27 after the crash. In this case, when the vehicle 29 further moves forward relative to the obstacle 27 from the state of FIG. 2, as shown in FIG. 3, the obstacle 27 reaches one of the load transmission members 25 while destroying the front bumper 31 and comes into contact with the contact surface 25*bs* of the load transmission member 25 as shown by the arrow A.

In a state of FIG. 3 in which the obstacle 27 is in contact with the contact surface 25*bs*, the end surface 25*ai*1 located on the inner side of the load transmission member 25 in the vehicle width direction comes into contact with the side of the power train 5 as shown by the arrow B, and the impact load of the obstacle 27 is thus transmitted to the power train 5. The impact load transmitted to the power train 5 is transmitted to the side members 1, 3 and the dash cross member 18 on the vehicle body side to which the power train 5 is attached via engine mounts and the like, and is absorbed by the vehicle body.

In this case, a high degree of load transmission can be achieved by using the strength and force of inertia of the power train 5 which is a structure in the engine room, and there is no need to greatly reinforce a vehicle body structure. As described above, in the first embodiment, the impact load received from the obstacle 27 can be efficiently transmitted to the vehicle body via the power train 5 even in a crash mode of small overlap crash.

As described above, in the first embodiment, the configuration is such that the load transmission members 25 transmit the impact load received from the obstacle 27 to the power train 5 inside the load transmission members 25 in the vehicle width direction. Accordingly, even when the side members 1, 3 and the front-rear direction members 17a, 17b of the suspension member 17 which are the vehicle-body side structural members receive impact load from the front side, there is no risk of the load transmission members 25 hindering axial crush deformation, and the vehicle-body front structure can have a sufficient performance of absorbing the impact load.

When the vehicle 29 further moves forward from the aforementioned state of FIG. 3 in which the obstacle 27 is in contact with the contact surface 25*bs*, the vehicle 29 behaves in such a way as to move laterally to the right side (corresponding to the right side in FIG. 3) in the vehicle width direction due to the inclination of the contact surface 25*bs*. Meanwhile, in a view from the vehicle 29 side, the obstacle 27 is guided by the inclined surface of the contact surface 25*bs* to move to the left side (corresponding to the left side in FIG. 3) in the vehicle width direction relative to the vehicle 29. In other words, the vehicle 29 moves laterally in the vehicle width direction to move away (to get farther) from the obstacle 27 in a small overlap crash as shown by the movement trajectory of the vehicle 29 (one-dot dash line P). This can reduce interference between the vehicle body and the obstacle 27 as much as possible and prevent entering of the obstacle 27 into the vehicle cabin 15, thereby suppressing deformation of the vehicle cabin 15.

Figure 4A:
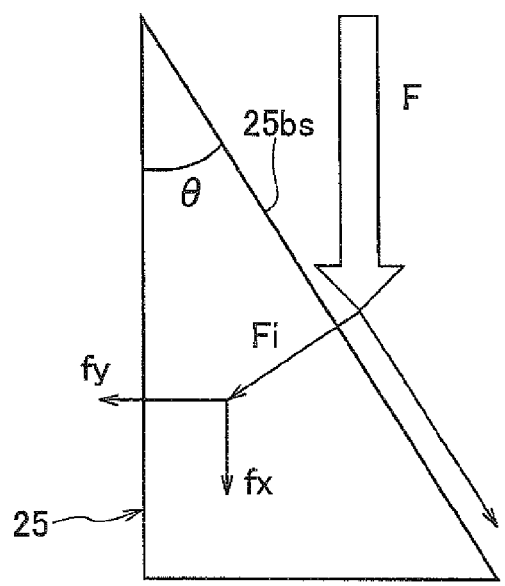
FIG. 4A is an explanatory view showing a direction in which impact load from the obstacle is inputted to an inclined contact surface of the load transmission member.
Figure 4B:
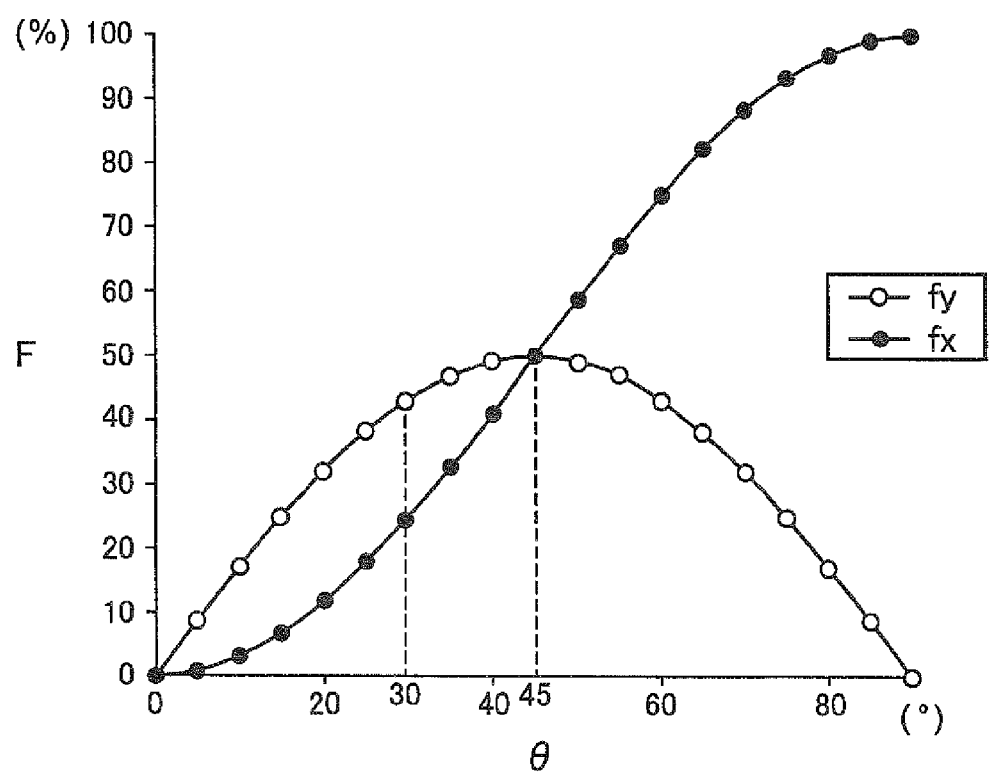
FIG. 4B is a graph showing relationships between the inclination angle of the contact surface and the impact load (axial force and lateral force)

FIG. 4A shows components of force (axial force fx, lateral force fy) in a case where impact load F acts on the inclined contact surface 25*bs* of the load transmission member 25 from the vehicle front side (corresponding to the upper side in FIG. 4A). FIG. 4B shows relationships among the axial force fx, the lateral force fy, and the inclination angle θ of the contact surface 25*bs*. In FIG. 4B, the horizontal axis represents the inclination angle θ, the vertical axis represents the impact load F, and scales of the vertical axis show proportions of the axial force f and the lateral force fy. Here, the axial force fx corresponds to the vehicle body front-rear direction and the lateral force fy corresponds to the vehicle width direction.

In FIG. 4A, H corresponds to a direction perpendicular to the contact surface 25*bs*. In this case, the following relationships are satisfied: [Fi=F·sinθ], [fy=Fi·cosθ=sinθ·cosθ], [fx=Fi·sinθ=sinθ·sinθ].

According to this, when the inclination angle θ is greater than 45°, the axial force fx is dominant and exceeds the lateral force fy. Meanwhile, when the inclination angle θ is smaller than 45°, the lateral force fy is dominant and exceeds the axial force fx. In other words, when the inclination angle θ is equal to or smaller than 45°, a case where the axial force fx is dominant and exceeds the lateral force fy can be avoided.

In the first embodiment, each of the contact surfaces 25*bs* which are the load receiving portions has the inclined surface inclined such that the rearward portion of the inclined surface in the vehicle body front-rear direction is located outside the frontward portion of the inclined surface in the vehicle body front-rear direction in the vehicle width direction, and the inclined surface is set to be inclined at an angle equal to or smaller than θ=45° with respect to the vehicle body front-rear direction in the plan view in the vehicle up-down direction. Accordingly, it is possible to avoid the case where the axial force fx is dominant and exceeds the lateral force fy. The vehicle 29 can be thereby moved laterally in the vehicle width direction away from the obstacle 27 more efficiently when the obstacle 27 comes into contact with the contact surface 25*bs* in a small overlap crash as shown in FIG. 3.

In the first embodiment, the inclination angle θ is set to about 30°. The lateral force fy is thus dominant over the axial force fx, and the vehicle 29 can be moved laterally in the vehicle width direction away from the obstacle 27 more surely. In FIG. 4B, when θ is 30°, the axial force fx can be reduced by half from that in the case where θ is 45° (fx=fy), but the lateral force fy is reduced by only about 13%. Accordingly, when θ is 30°, the lateral force fy is about 1.7 times the axial force fx.

As described above, the deformation of the vehicle body in the front-rear direction can be suppressed by reducing input load in the vehicle body front-rear direction (axial force fx).

In the first embodiment, the load transmission members 25 are located between the side member 1 and the front-rear direction member 17a of the suspension member 17 and between the side member 3 and the front-rear direction member 17b of the suspension member 17. Accordingly, in a crash mode of normal frontal crash other than the aforementioned small overlap crash, the side members 1, 3 and the suspension member 17 are hardly affected by the load transmission members 25 and are crushed and deformed to absorb impact load in much the same way as in a vehicle provided with no load transmission members 25. In other words, in the first embodiment, there is no risk of the load transmission members 25 hindering the axial crush deformation of the side members 1, 3 in the normal frontal crash, and the vehicle-body front structure can have a sufficient performance of absorbing the impact load.

In the first embodiment, the load transmission members 25 are attached to the front-rear direction members 17a, I 7b of the suspension member 17. Accordingly, the performance of absorbing the impact load particularly with the side members 1, 3 in the aforementioned normal frontal crash can be more surely maintained. In the load transmission members 25, the contact portions 25*b* protrude outside the side members 1, 3 in the vehicle width direction. However, the contact portions 25*b* are inclined in such a way that the frontward portions of the contact portions 25*b* in the vehicle body front-rear direction are located inside the rearward portions of the contact portions 25*b* in the vehicle body front-rear direction in the vehicle width direction. Accordingly, the exterior shape of the vehicle body is less likely to be affected and the degree of freedom in vehicle body design can be secured.

Second Embodiment

Figure 5:
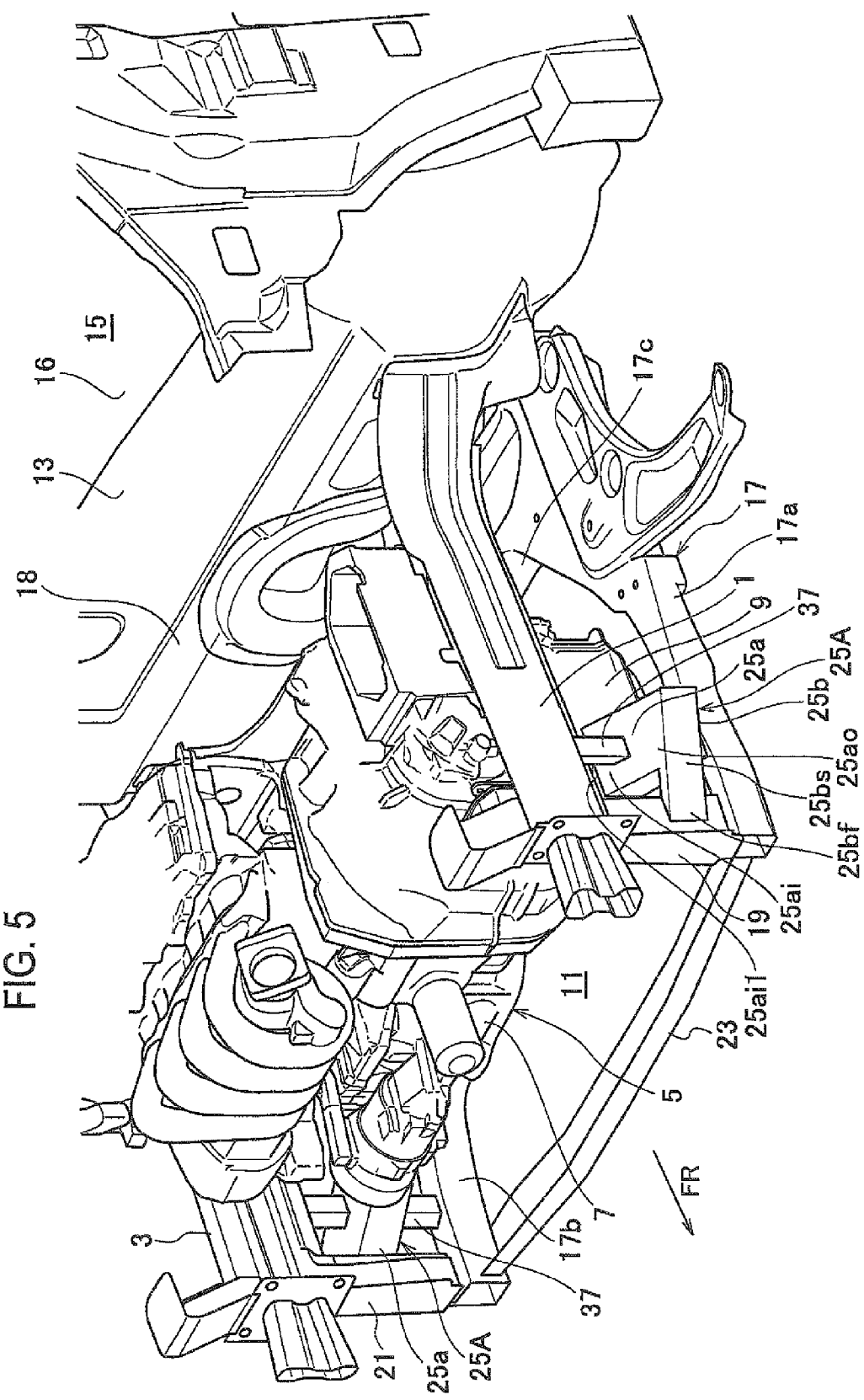
FIG. 5 is a perspective view of a vehicle-body front structure in a second embodiment of the present invention.

FIG. 5 is a perspective view showing a vehicle-body front structure in a second embodiment of the present invention, and the direction shown by the arrow FR in the drawing is a vehicle-body front side. The second embodiment is different from the first embodiment in a structure of attaching load transmission members 25A to a vehicle body. Other configurations are the same as those in the first embodiment, and the same constitutional elements as those in the first embodiment are denoted by the same reference numerals.

In FIG. 5, side members 1, 3 and front-rear direction members 17a, 17b of a suspension member 17 are connected to one another at positions near vertical connecting members 19, 21 by connection members 37 extending in an up-down direction. The load transmission members 25A are attached to lower portions of the connection members 37 at positions slightly closer to the suspension member 17. Note that, in the load transmission members 25A, the same constitutional elements as those of the load transmission members 25 in the first embodiment are denoted by the same reference numerals.

The load transmission members 25A are fixed to the connection members 37 with the connection members 37 penetrating fixation portions 25a of the load transmission members 25A in the up-down direction at substantially-center positions of the fixation portions 25a. The positional relationship of the load transmission members 25A to the vehicle body in a plan view in the vehicle body up-down direction in this fixed state is substantially the same as that in the first embodiment.

Accordingly, also in the second embodiment, transmission of impact load and behavior of a vehicle 29 is almost the same as that in the description of FIGS. 2 and 3 in a small overlap crash in which an obstacle 27 collides with the vehicle 29 from a vehicle-body front side at a position outside the side members 1, 3 in the vehicle width direction.

Specifically, the impact load of the obstacle 27 is efficiently transmitted to the vehicle body via a power train 5, and the vehicle 29 moves laterally in the vehicle width direction to move away (to get farther) from the obstacle 27, thereby suppressing deformation of a vehicle cabin 15. In a normal frontal crash, the side members 1, 3 and a suspension member 17 are hardly affected by the load transmission members 25A and are crushed and deformed to absorb the impact load in much the same way as in a vehicle provided with no load transmission members 25A.

In the second embodiment, the load transmission members 25A can be fixed at suitable positions in the connection members 37 in the up-down direction. This allows the load transmission members 25A to be arranged at such positions that the impact load is easily transmitted to the power train 5, and the load can be more efficiently transmitted.

Third Embodiment

Figure 6:
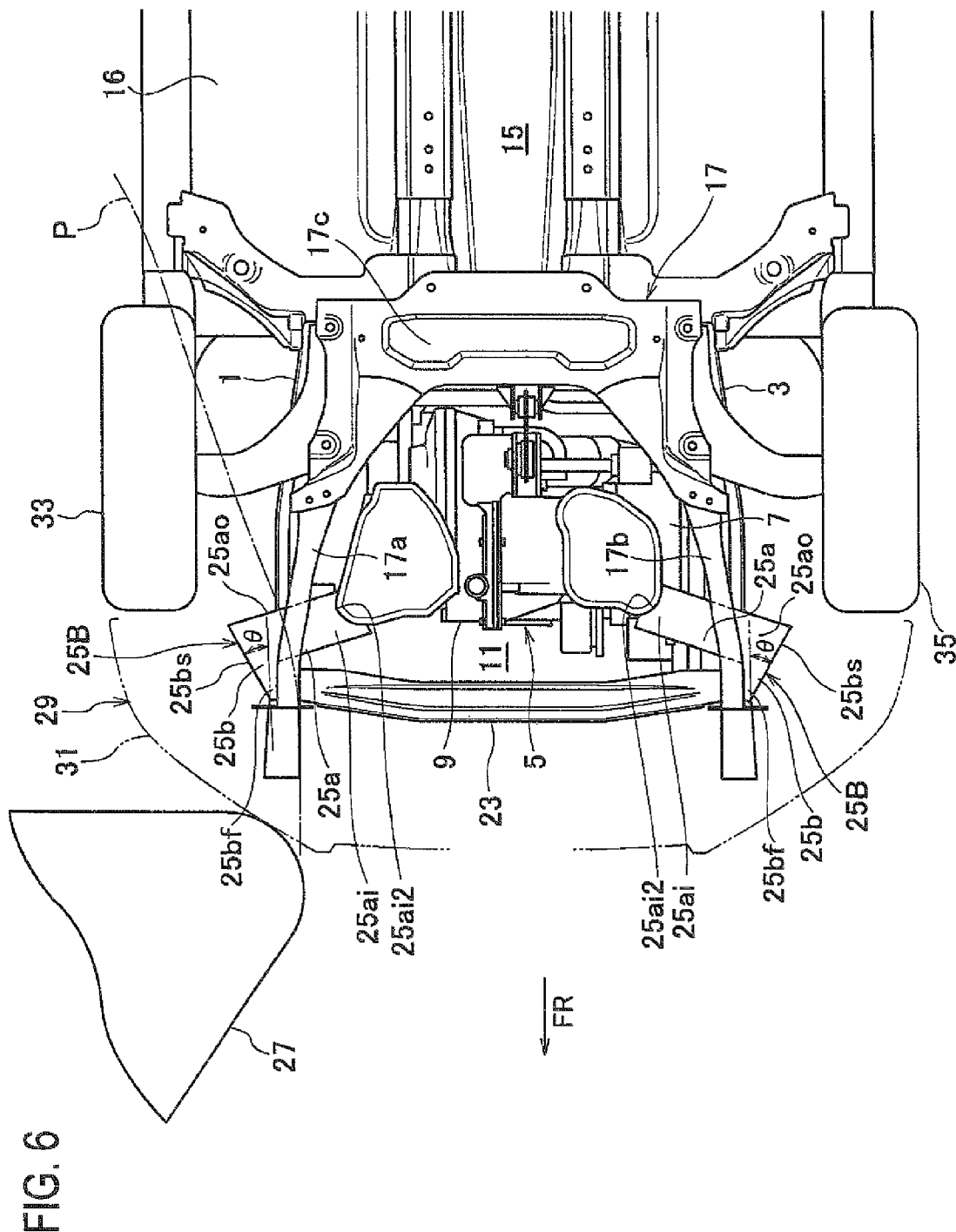
FIG. 6 is a bottom view of a vehicle-body front structure in a third embodiment of the present invention.

FIG. 6 is a bottom view showing a vehicle-body front structure in a third embodiment of the present invention, and the direction shown by the arrow FR in the drawing is a vehicle-body front side. The third embodiment is different from the first and second embodiments in a structure of attaching load transmission members 25B to a vehicle body. Other configurations are the same as those in the first and second embodiments, and the same constitutional elements as those in the first and second embodiments are denoted by the same reference numerals. Note that, in the load transmission members 25B, the same constitutional elements as those of the load transmission members 25 in the first embodiment are denoted by the same reference numerals.

In the third embodiment, the load transmission members 25B are attached to a power train 5 and are integrated with the power train 5. In the load transmission members 25B, bonding portions 25ai2 are formed in protruding end portions 25ai protruding inward in the vehicle width direction and are bonded and fixed to an outer wall of the power train 5. The positional relationship of the load transmission members 25B to the vehicle body in this state is substantially the same as that of the load transmission members 25A in the second embodiment.

Accordingly, also in the third embodiment, transmission of impact load and behavior of a vehicle 29 is the same as that in the description of FIGS. 2 and 3 in a small overlap crash in which an obstacle 27 collides with the vehicle 29 from a vehicle-body front side at a position outside side members 1, 3 in a vehicle width direction.

Specifically, the impact load of the obstacle 27 is efficiently transmitted to the vehicle body via the power train 5, and the vehicle 29 moves laterally in the vehicle width direction to move away (to get farther) from the obstacle 27, thereby suppressing deformation of a vehicle cabin 15. In a normal frontal crash, the side members 1, 3 and a suspension member 17 are hardly affected by the load transmission members 25B and are crushed and deformed to absorb the impact load in much the same way as in a vehicle provided with no load transmission members 25B.

In the third embodiment, the load transmission members 25B are provided on the power train 5. Accordingly, there is no need to provide attachment structures for the load transmission members 25B on the vehicle body side, and change of vehicle structure is unnecessary. Moreover, as in the second embodiment, it is possible to dispose the load transmission members 25B at such positions that the impact load is easily transmitted to the power train 5, and the load can be more efficiently transmitted.

As described above, in the first to third embodiments of the present invention, when the obstacle 27 on the vehicle-body front side comes into contact with any of the load transmission members 25, 25A, 25B, the impact load in this contact is transmitted to the vehicle body via the power train 5 inside the load transmission member 25, 25A, 25B in the vehicle width direction and is absorbed. At this time, the impact load acts inward in the vehicle width direction. Accordingly, the vehicle body moves in a direction away from the obstacle 27 and interference between the vehicle body and the obstacle 27 can be prevented. In this case, the load transmission member 25, 25A, 25B transmits the impact load received from the obstacle 27 to the power train 5 inside the load transmission member 25, 25A, 25B in the vehicle width direction. Due to this, even when the vehicle-body side structural members receive the impact load from the front side, there is no risk of the load transmission members 25 hindering axial crush deformation, and the vehicle-body front structure can have a sufficient performance of absorbing the impact load.

Fourth Embodiment

Figure 7:
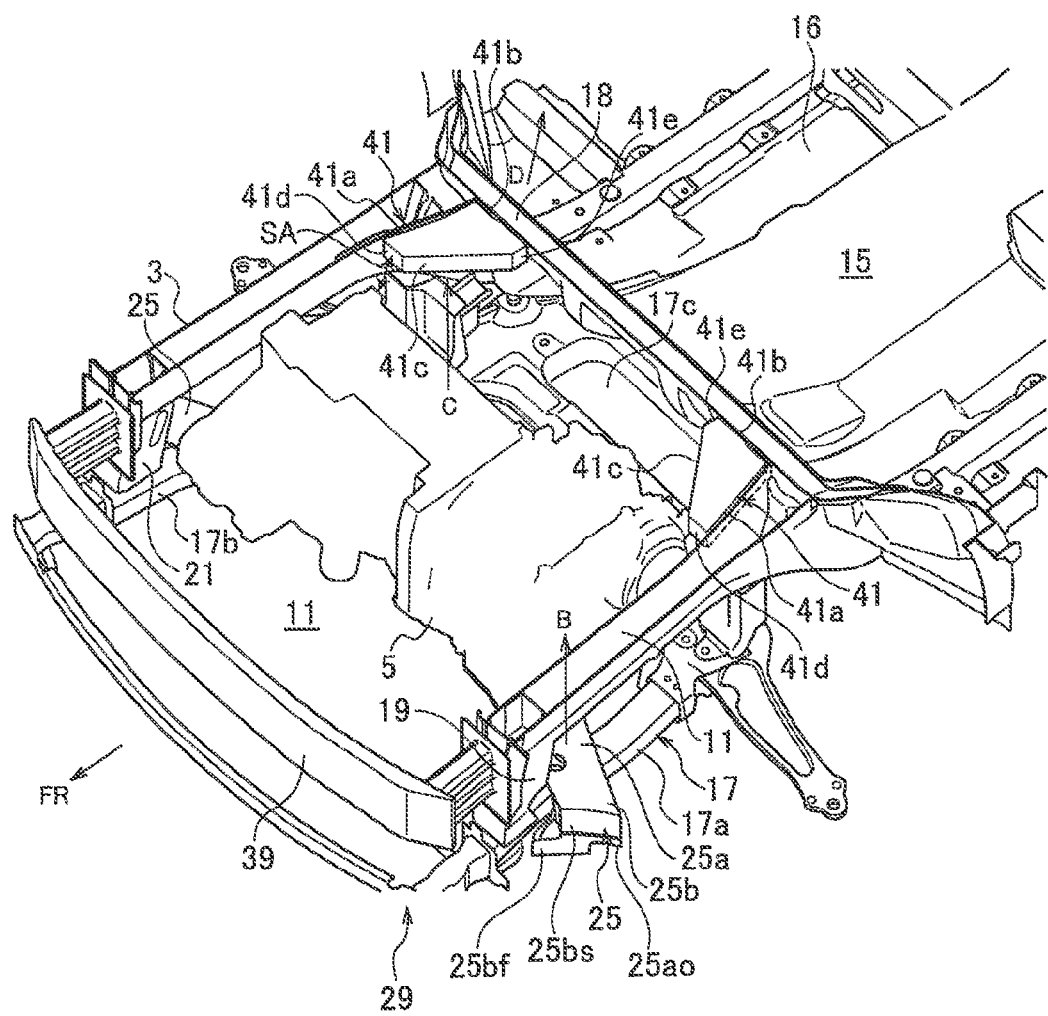
FIG. 7 is a perspective view of a vehicle-body front structure in a fourth embodiment of the present invention.

FIG. 7 is a perspective view showing a vehicle-body front structure in a fourth embodiment of the present invention, and the direction shown by the arrow FR in the drawing is a vehicle-body front side. The fourth embodiment basically includes the same constitutional elements as those in the first to third embodiments described above, and the same constitutional elements as those in the first to third embodiments are denoted by the same reference numerals.

In the fourth embodiment, although omitted in the first to third embodiments, there is illustrated a bumper reinforcement 39 which connects end portions of side members 1, 3 on a vehicle front side to each other and which extends in a vehicle width direction. Moreover, in the fourth embodiment, although load transmission members 25 are attached to a suspension member 17 as in the first embodiment, the load transmission members 25 may be attached to connection members 37 as in the second embodiment shown in FIG. 5 or attached to a power train 5 as in the third embodiment shown in FIG. 6.

In the fourth embodiment, second load transmission members 41 are provided on both sides of the vehicle body on a load transmission path through which impact load inputted from an obstacle 27 into the power train 5 via the load transmission members 25 as shown in FIG. 2 is transmitted from the power train 5 to the vehicle body. Note that FIG. 7 shows a case where the obstacle 27 relatively approaches a vehicle 29 from front of a position outside, in the vehicle width direction, the side member 1 on the vehicle-body left side. A transmission path of load received from the outside of the vehicle from the right side is almost right-left symmetric to that shown in FIG. 7.

The transmission path of the load from the vehicle-body left side is shown by the arrows B, C, and D in FIG. 7. Specifically, the impact load inputted into the load transmission member 25 from the obstacle 27 is transmitted to the power train 5 as shown by the arrow B, then transmitted from the power train 5 to the second load transmission member 41 as shown by the arrow C, and transmitted from the second load transmission member 41 to the vehicle body on the vehicle cabin 15 side behind an engine room 11 as shown by the arrow D.

The second load transmission members 41 are attached in vicinity of bonding portions between the side members 1, 3 and a dash cross member 18 which are vehicle body structural members. The second load transmission members 41 are formed of flat plate members having a shape roughly similar to a right triangle in a plan view in a vehicle body up-down direction, and have stiffness greater than that of the side members 1, 3 and the dash cross member 18.

The second load transmission members 41 include: side surfaces 41a bonded to side surfaces of the side members 1, 3 on the engine room 11 side; and rear surfaces 41b bonded to a front surface of a dash cross member 18 on the engine room 11 side. Moreover, each of the second load transmission members 41 includes a load receiving surface 41c which is substantially perpendicular to a transmission direction of load from the power train 5 shown by the arrow C and which receives the load. A gap SA is formed between the power train 5 and each of the load receiving surfaces 41c.

Each of the load receiving surfaces 41c is inclined with respect to a vehicle body front-rear direction in such a way that a frontward portion of the load receiving surface 41c in the vehicle body front-rear direction is located outside a rearward portion of the load receiving surface 41c in the vehicle body front-rear direction in the vehicle width direction. A front surface 41d substantially perpendicular to the vehicle body front-rear direction is formed between a front end of the inclined load receiving surface 41c and a front end of the side surface 41a, and an inner side surface 41e substantially perpendicular to the vehicle width direction is formed between a rear end of the load receiving surface 41c and an inner end portion of the rear surface 41b in the vehicle width direction.

Next, description is given of the transmission path of impact load in a small overlap crash in which the obstacle 27 as shown in FIG. 2 collides with the vehicle 29 from the vehicle-body left side as in the first embodiment. The obstacle 27 reaches the load transmission member 25 while destroying a front bumper not illustrated in FIG. 7, and the situation is substantially the same as that in the first embodiment until the load received by the load transmission member 25 in this case is transmitted to the power train 5.

Specifically, when the load transmission member 25 transmits the load to the power train 5 in the direction shown by the arrow B as shown in FIG. 7, the power train 5 moves in the direction shown by the arrow C and interferes with the second load transmission member 41 ahead of the power train 5. The second load transmission member 41 receives the load from the power train 5 on the load receiving surface 41c, and the received load is transmitted from the side surface 41a to the side member 3 and from the rear surface 41b to the dash cross member 18.

The load transmitted to the side member 3 and the dash cross member 18 is transmitted to the vehicle body on the vehicle cabin 15 side such as a floor panel 16 behind the engine room 11. In this case, since the second load transmission member 41 has stiffness greater than that of the side members 1, 3 and the dash cross member 18, the second load transmission member 41 can efficiently transmit the load received from the power train 5 to the side member 3 and the dash cross member 18 as well as to the vehicle body behind these members without being greatly damaged.

As described above, also in the fourth embodiment, the impact load received from the obstacle 27 can be efficiently transmitted to the vehicle cabin 15 side of the vehicle body via the power train 5 by providing the load transmission members 25 and the second load transmission members 41, even in a crash mode of small overlap crash.

Although description is given of the example in which the second load transmission members 41 are bonded to the side members 1, 3 and the dash cross member 18, it is only necessary that the second load transmission members 41 are configured to receive the load from the power train 5 having moved in the direction shown by the arrow C in crash and transmit the received load to the side member 3 and the dash cross member 18. For example, the following configuration may be employed: the second load transmission members 41 are not bonded to the side members 1, 3 and the dash cross member 18 but are instead bonded to other members; the side surfaces 41a of the second load transmission members 41 are provided adjacent to the side surfaces of the side members 1, 3 on the engine room 11 side not to be in contact with the side surfaces while facing the side surfaces, or are in contact with the side surfaces; the rear surfaces 41b of the second load transmission members 41 are provided adjacent to the front surface of the dash cross member 18 on the engine room 11 side not to be in contact with the front surface while facing the front surface, or are in contact with the front surface. Also in this case, the second load transmission members 41 can receive the load from the power train 5 having moved in the direction shown by the arrow C in crash and transmit the received load to the side member 3 and the dash cross member 18. Moreover, it is possible to employ a configuration in which: the side surfaces 41a of the second load transmission members 41, are bonded to the side surfaces of the side members 1, 3 on the engine room 11 side; and the rear surfaces 41b of the second load transmission members 41 are provided adjacent to the front surface of the dash cross member 18 on the engine room 11 side not to be in contact with the front face while facing the front surface, or are in contact with the front surface. Furthermore, a configuration in which relationships are the opposite from that described above can be employed.

Fifth Embodiment

Figure 8:
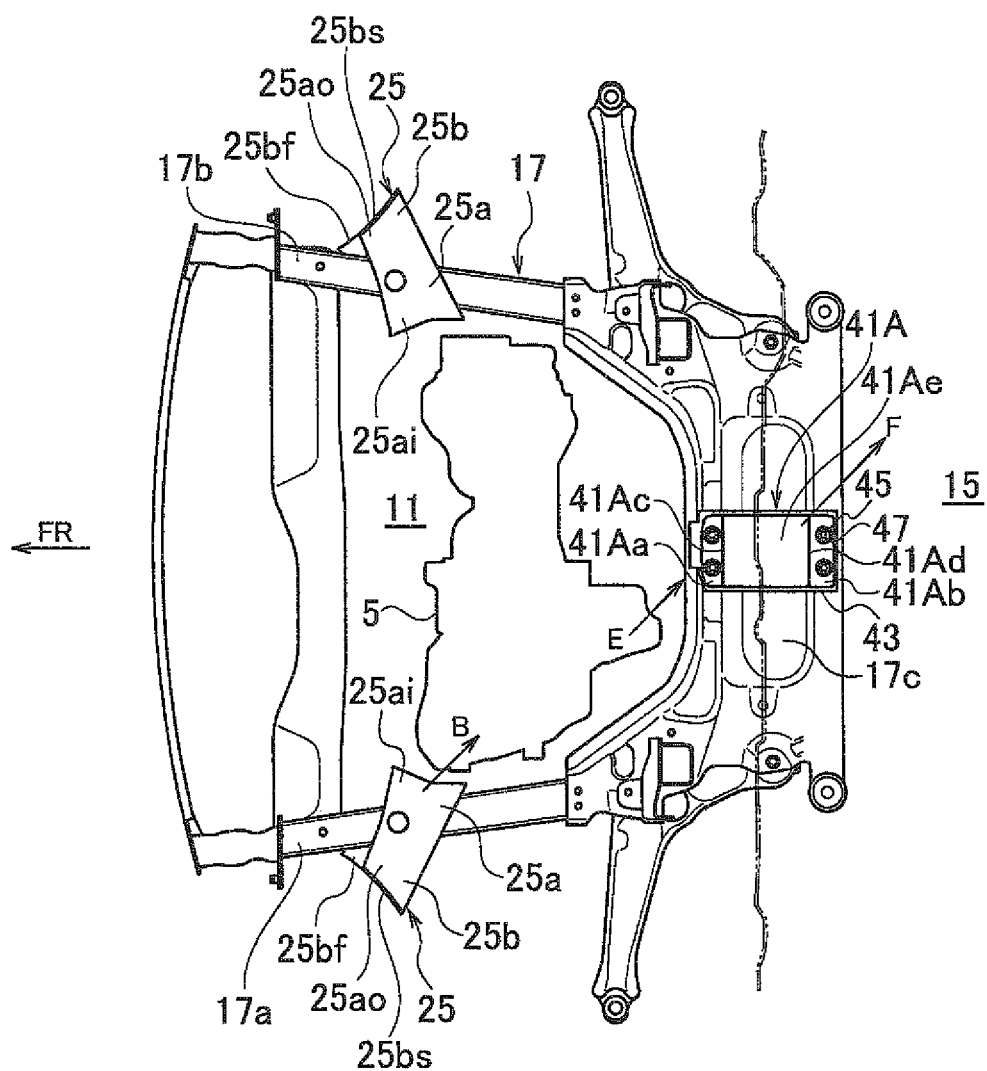
FIG. 8 is a plan view of a vehicle-body front structure in a fifth embodiment of the present invention.
Figure 9:
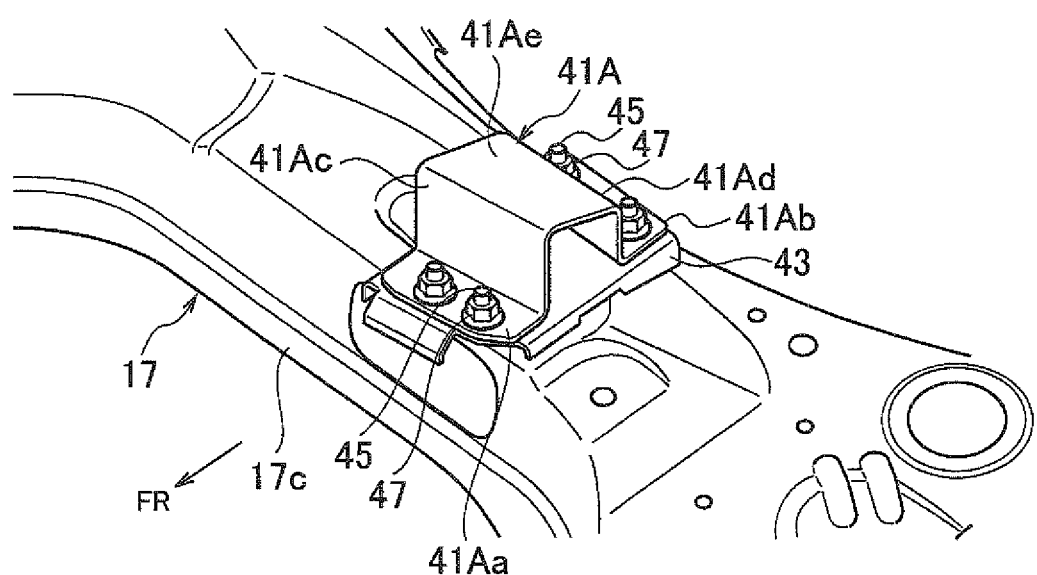
FIG. 9 is a perspective view of a portion around a second load transmission member in the vehicle-body front structure in the fifth embodiment of the present invention
Figure 10A:
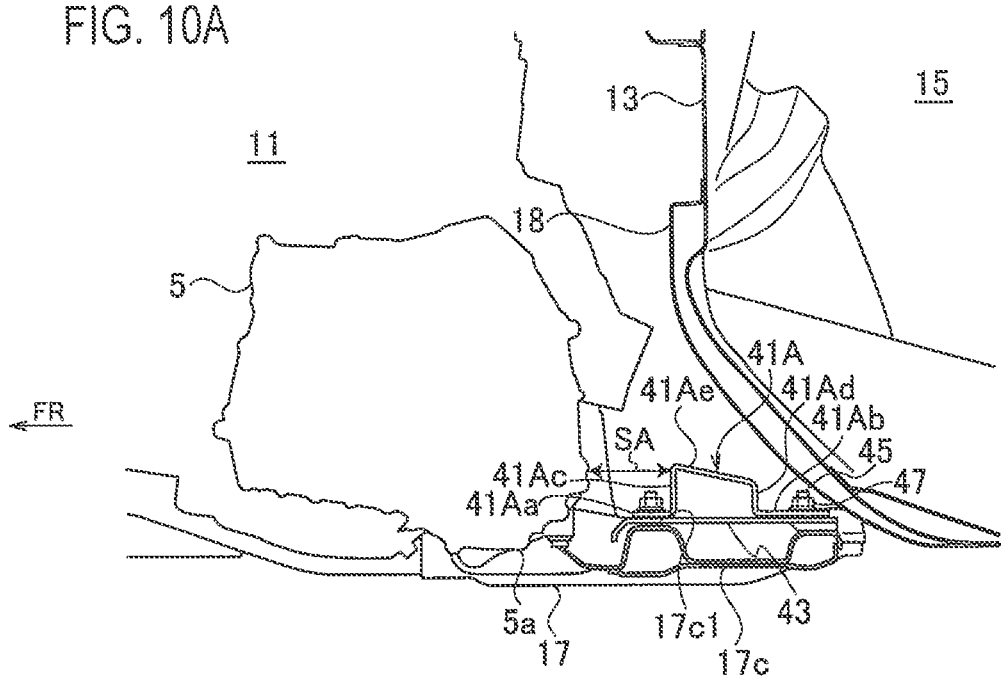
FIG. 10A is a cross-sectional view in which a position corresponding to the second load transmission member in the fifth embodiment is viewed laterally in a vehicle width direction.

In the fifth embodiment, as shown in FIGS. 8, 9, and 10A, a second load transmission member 41A provided instead of the second load transmission members 41 in the fourth embodiment is attached to an upper surface of a vehicle width direction member 17c of a suspension member 17. The vehicle width direction member 17c extends in a vehicle width direction, and the second load transmission member 41A is attached to a substantially-center portion of the vehicle width direction member 17c in a vehicle width direction via a base plate 43 having a flat plate shape.

The second load transmission member 41A is formed by bending a plate-shaped member and includes a pair of fixation portions 41Aa, 41Ab located on both sides of the second load transmission member 41A in a vehicle body front-rear direction. Meanwhile, four stud bolts 45 protrude upward from the upper surface of the vehicle width direction member 17c of the suspension member 17. The stud bolts 45 are inserted into bolt insertion holes in the base plate 43 and the fixation portions 41Aa, 41Ab, and nuts 47 are fastened from above the fixation portions 41Aa, 41Ab.

The second load transmission member 41A includes a front wall 41Ac standing upward from a vehicle-body rear side end portion of the fixation portion 41Aa on the vehicle-body front side and a rear wall 41Ad standing upward from a vehicle-body front side end portion of the fixation portion 41Ab on the vehicle-body rear side. The front wall 41Ac and the rear wall 41Ad are connected to each other by an upper wall 41Ae. The height of the front wall 41Ac in an up-down direction is higher than that of the rear wall 41Ad, and an upper end of the front wall 41Ac is located above an upper end of the rear wall 41Ad. The upper wall 41Ae is thus an inclined surface inclined in such a way that the height becomes lower from the front wall 41Ac toward the rear wall 41Ad.

In FIG. 10A, a gap SA is formed between the front wall 41Ac of the second load transmission member 41A and a power train 5 located on a vehicle-body front side of the vehicle width direction member 17c of the suspension member 17. Moreover, a lower end 5a of the power train 5 is located slightly below an upper surface 17c1 of the vehicle width direction member 17c of the suspension member 17.

In the fifth embodiment, load received by one of load transmission members 25 from an obstacle 27 in a small overlap crash as in the fourth embodiment is transmitted to the power train 5 as shown by the arrow B. The load received by the power train 5 is transmitted to the second load transmission member 41A as shown by the arrow E by interference of the power train 5 with the second load transmission member 41A.

The second load transmission member 41A receives the load from the power train 5 on the front wall 41Ac which is a load receiving surface, and the received load is transmitted to the vehicle width direction member 17c of the suspension member 17. Then, the load transmitted to the vehicle width direction member 17c is transmitted to a vehicle body on a vehicle cabin 15 side such as a floor panel 16 behind an engine room 11 as shown by the arrow F. In this case, since the second load transmission member 41A has greater stiffness than the suspension member 17, the second load transmission member 41A can efficiently transmit the load received from the power train 5 to the suspension member 17 and the vehicle body behind the suspension member 17 without being greatly damaged.

Due to this, also in the fifth embodiment, the impact load received from the obstacle 27 can be efficiently transmitted to the vehicle cabin 15 side of the vehicle body via the power train 5 as in the fourth embodiment by providing the load transmission members 25 and the second load transmission member 41A, even in a crash mode of small overlap crash.

Figure 10B:
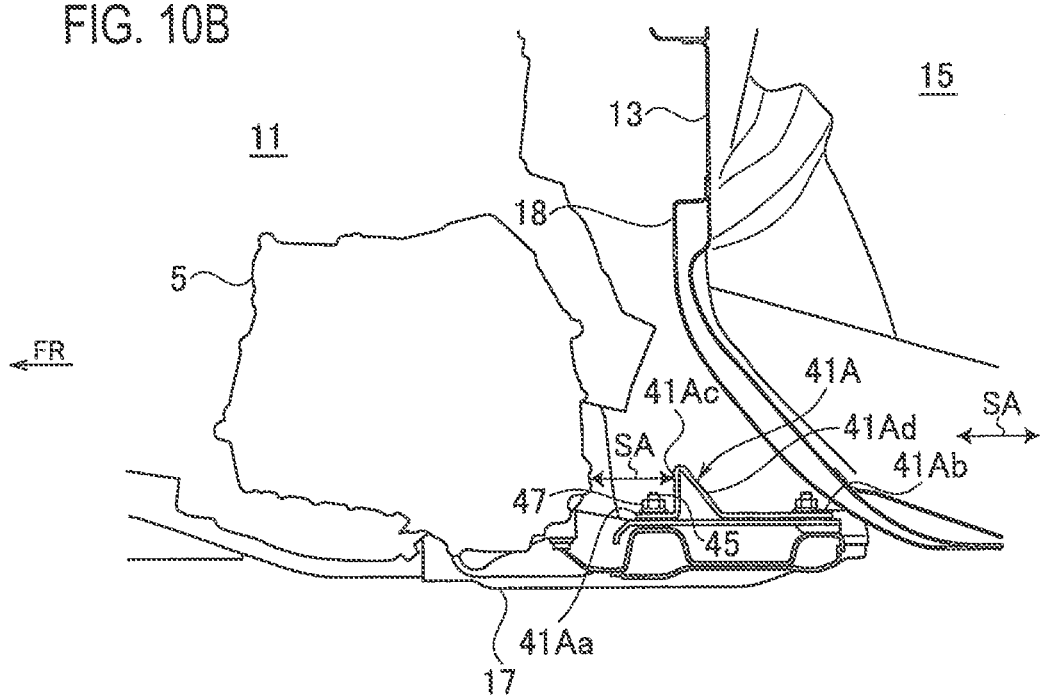
FIG. 10B is a cross-sectional view corresponding FIG. 10A and showing a modified example of the second load transmission member in the fifth embodiment.

FIG. 10B shows a modified example of the second load transmission member 41A. The shape of the second load transmission member 41A of FIG. 10B in a side view is a triangle, while the shape of the second load transmission member 41A of FIG. 10B in the side view is a quadrangle.

Specifically, the second load transmission member 41A of FIG. 10B is the same as the example of FIGS. 10A in that the second load transmission member 41A includes the pair of fixation portions 41Aa, 41Ab located on both sides of the second load transmission member 41A in the vehicle front-rear direction.

The second load transmission member 41A of FIG. 10B includes the front wall 41Ac standing upward from the vehicle-body rear side end portion of the fixation portion 41Aa on the vehicle-body front side and the rear wall 41Ad standing obliquely upward toward the vehicle-body front side from the vehicle-body front side end portion of the fixation portion 41Ab on the vehicle-body rear side. The rear wall 41Ad is inclined in such a way that a vehicle-body front side end portion of the rear wall 41Ad is located on the vehicle-body front side of a rear side end portion thereof, and an upper end of the inclined rear wall 41Ad is connected to an upper end of the front wall 41Ac.

In the example of FIG. 10B, as in the example of FIG. 10A, the load received by the power train 5 is received by the second load transmission member 41A to be transmitted to the suspension member 17 and is efficiently transmitted to the vehicle body on the vehicle cabin 15 side behind the suspension member 17. Accordingly, effects similar to those in the example of FIG. 10A can be obtained.

Sixth Embodiment

Figure 11:
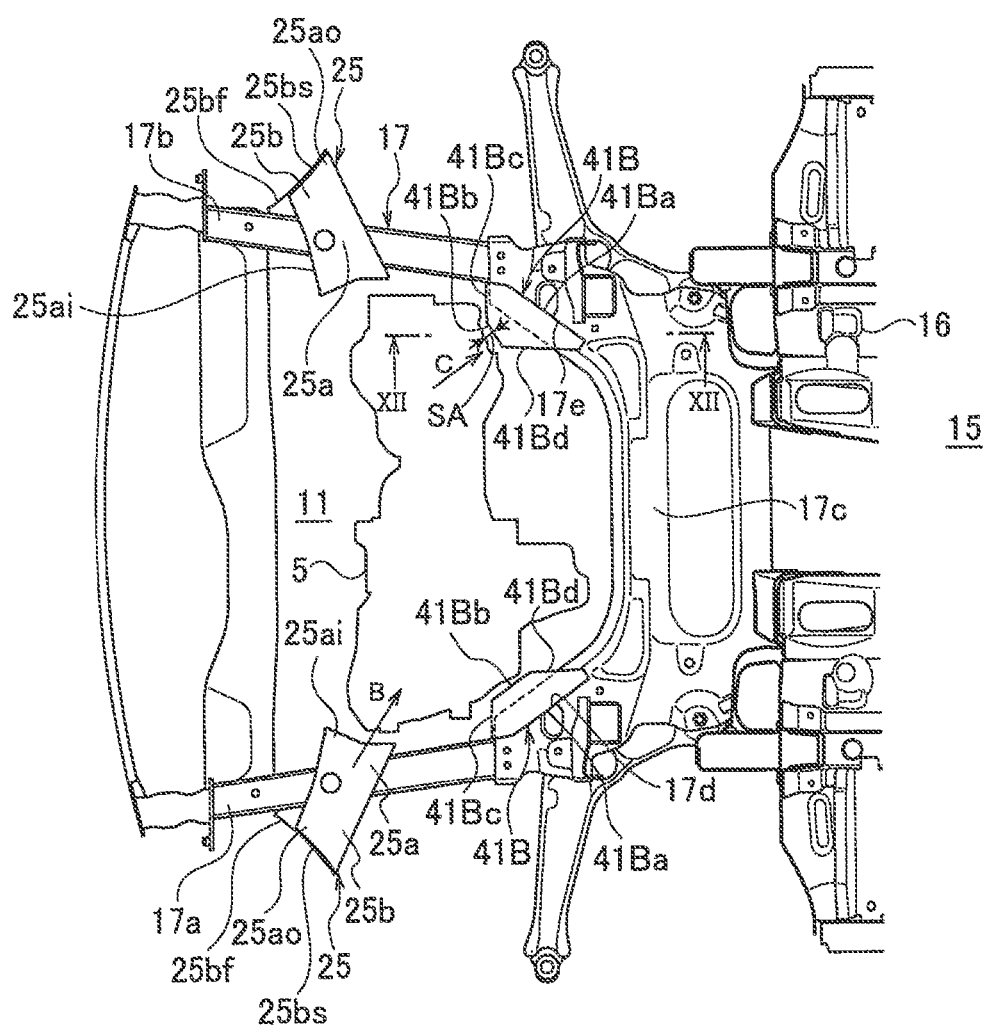
FIG. 11 is a plan view of a vehicle-body front structure in a sixth embodiment of the present invention.
Figure 12:
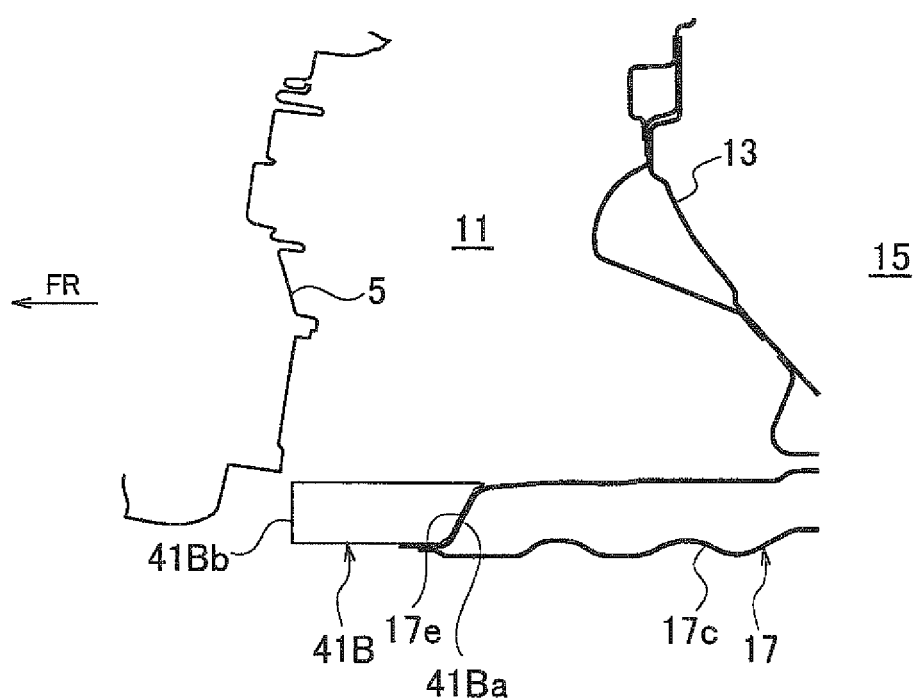
FIG. 12 is a cross-sectional view taken along the XII-XII line of FIG. 11.

In the sixth embodiment, as shown in FIG. 11, a second load transmission member 41B is provided in vicinity of a boundary portion between a vehicle width direction member 17c and each of front-rear direction members 17a, 17b of a suspension member 17. In this case, the front-rear direction members 17a, 17b are at positions substantially overlapping the side members 1, 3 shown in FIG. 7 in an up-down direction, and the vehicle width direction member 17c is at a position substantially overlapping the dash cross member 18 shown in FIG. 7 in the up-down direction. The second load transmission members 41B are thus at positions substantially overlapping the second load transmission members 41 shown in FIG. 7 in the up-down direction, and the second load transmission members 41B of FIG. 11 are located below the second load transmission members 41 of FIG. 7.

Accordingly, in this case, the power train 5 to which load is transmitted from one of load transmission members 25 due to movement of the load transmission member 25 in the direction of the arrow B moves in the direction of the arrow C and interferes with one of the second load transmission members 41B to transmit the load. Here, in the suspension member 17, inclined portions 17d, 17e continuously connecting the front-rear direction members 17a, 17b and the vehicle width direction member 17c to one another are formed in a boundary portion between the front-rear direction member 17a and the vehicle width direction member 17c and a boundary portion between the front-rear direction member 17b and the vehicle width direction member 17c. The second load transmission members 41B are attached to the inclined portions 17d, 17e. Note that, as in the fourth embodiment, the second load transmission members 41B may be attached to members other than the inclined portions 17d, 17e instead of the inclined portions 17d, 17e, as long as the configuration is such that second load transmission members 41 B can transmit load to the inclined portions 17d, 17e in crash.

The second load transmission members 41B include joint portions 41Ba joined to the inclined portions 17d, 17e and load receiving surfaces 41Bb located on the power train 5 side which the opposite side to the joint portions 41Ba. The load receiving surfaces 41Bb are arranged to be spaced away from the power train 5 with a gap SA therebetween. Moreover, the second load transmission members 41B include front surfaces 41Bc, substantially orthogonal to a vehicle body front-rear direction, on a vehicle-body front side and side surfaces 41Bd, substantially orthogonal to a vehicle width direction, on vehicle body inner sides. The second load transmission members 41B as described above have greater stiffness than the side members 1, 3 and the suspension member 17.

In the sixth embodiment, load received by one of the load transmission members 25 from an obstacle 27 in a small overlap crash as in the fourth embodiment is transmitted to the power train 5 as shown by the arrow B. Then, the load received by the power train 5 acts on the load receiving surface 41Bb of the second load transmission member 41B on the opposite side in the vehicle width direction as shown by the arrow C.

The load received by the second load transmission member 41B is transmitted to the side members 1, 3 and the suspension member 17 and is further transmitted to a vehicle body such as a floor panel 16 on the vehicle cabin 15 side behind an engine room 11. In this case, since the second load transmission member 41B has greater stiffness than the side members 1, 3 and the suspension member 17, the second load transmission member 41B can efficiently transmit the load received from the power train 5 to the vehicle body on the vehicle cabin 15 side without being greatly damaged.

Seventh Embodiment

Figure 13:
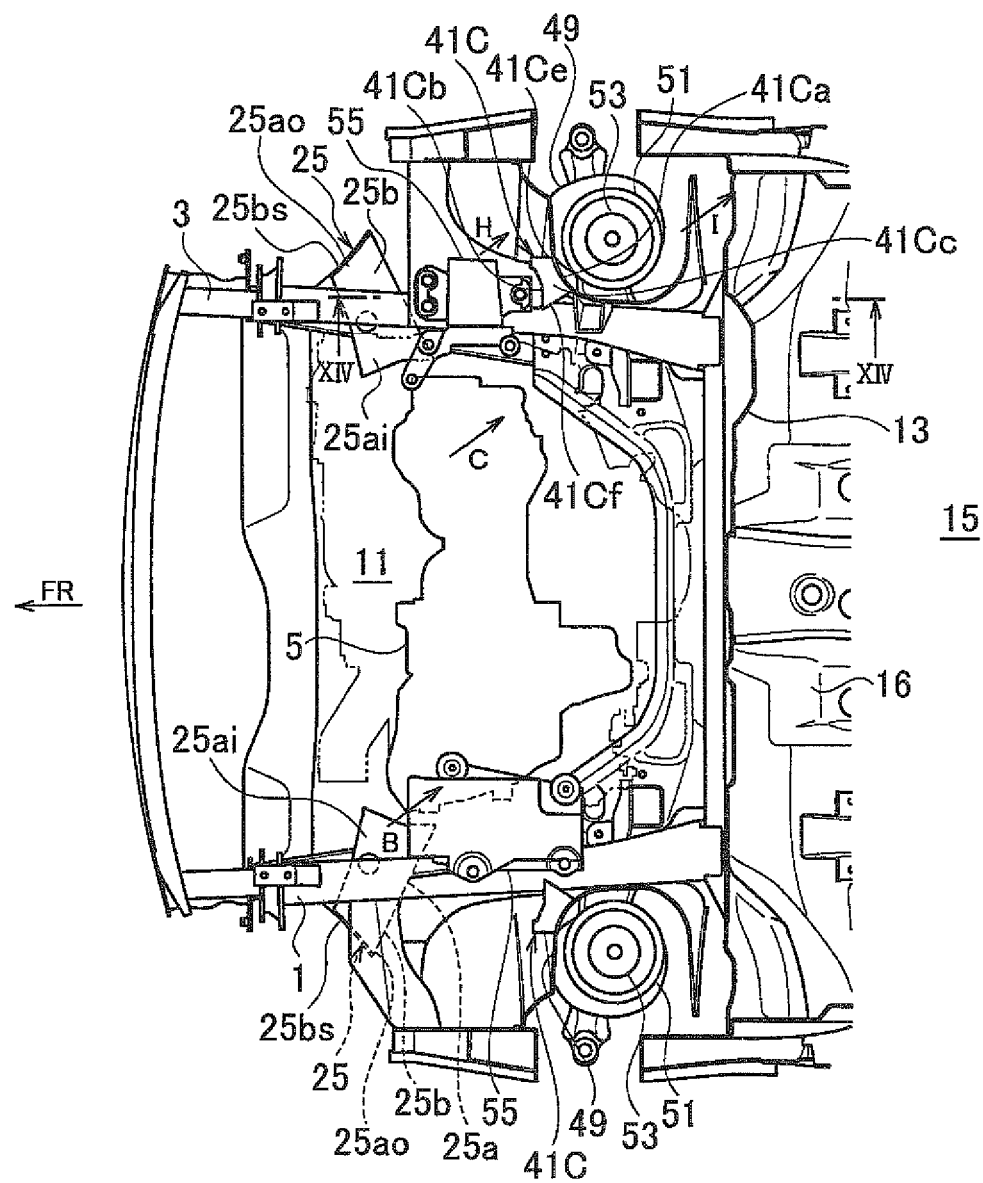
FIG. 13 is a plan view of a vehicle-body front structure in a seventh embodiment of the present invention.

In the seventh embodiment, as shown in FIG. 13, second load transmission members 41C are provided on outer surfaces of strut housings 49 on a vehicle-body front side, the strut housings 49 located outside side members 1, 3 in a vehicle width direction. A coil spring 51 and a shock absorber 53 are housed in each of the strut housings 49. In the seventh embodiment, a power train 5 is held by engine mounts 55 in a hanged manner, the engine mounts 55 being mounting members provided on upper surfaces of the side members 1, 3. Each of the second load transmission members 41C is located on a straight line connecting a substantial center position of the corresponding engine mount 55 and a substantial center position of the corresponding strut housing 49 to each other.

Figure 14:
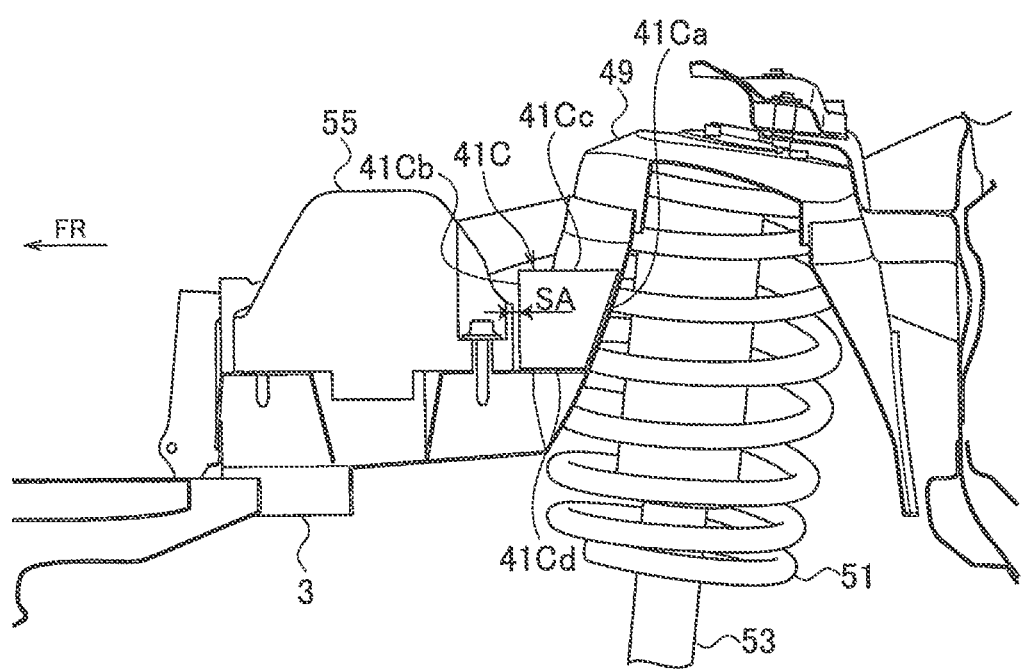
FIG. 14 is a cross-sectional view taken along the XIV-XIV line of FIG. 13.

As shown in FIG. 14, each of the second load transmission members 41C includes a joint surface 41Ca joined to the outer surface of the strut housing 49 and a load receiving surface 41Cb located on the engine mount 55 side which is the opposite side to the joint surface 41Ca. As shown in FIG. 13, the joint surface 41Ca is formed to have a concave curved surface to be in close contact with an outer surface of a convex curved surface of the strut housing 49. Moreover, as shown in FIGS. 13 and 14, the load receiving surface 41Cb is formed to have a concave curved surface at a position facing the engine mount 55 and is arranged to be spaced away from the engine mount 55 with a gap SA therebetween.

Furthermore, the second load transmission member 41C includes an upper surface 41Cc, a lower surface 41Cd, an outer surface 41Ce, and an inner surface 41Cf. Accordingly, the second load transmission member 41C is formed of a block member having a substantially-hexahedral shape.

In the seventh embodiment, load received by one of load transmission members 25 from an obstacle 27 in a small overlap crash as in the fourth embodiment is transmitted to the power train 5 as shown by the arrow B of FIG. 13. Then, the load received by the power train 5 acts in the direction of the arrow C on the opposite side in the vehicle width direction, and this load acts on the engine mount 55.

The engine mount 55 receives the load and is thereby moved in the direction shown by the arrow H together with the side member 3 to interfere with the second load transmission member 41C. The second load transmission member 41C receives the load on the load receiving surface 41Cb.

The load received by the second load transmission member 41C is transmitted to the strut housing 49 and is then transmitted to the coil spring 51 and the shock absorber 53 in the strut housing 49. The load transmitted to the coil spring 51 and the shock absorber 53 is transmitted to the vehicle body such as a floor panel 16 on a vehicle cabin 15 side behind an engine room 11 as shown by the arrow I.

In this case, the second load transmission member 41C has greater stiffness than the strut housing 49 and can thus efficiently transmit the load received from the power train 5 to the vehicle body on the vehicle cabin 15 side without being greatly damaged. The second load transmission member 41C as described above is provided on each of the strut housings 49 located in a load transmission path from a portion of the power train 5 to the vehicle body, the portion being a portion where the power train 5 is attached to the engine mount 55.

In the fourth to seventh embodiments described above, the load transmission members 25 are configured to transmit the impact load received from the obstacle 27 to the power train 5 inside the load transmission members 25 in the vehicle width direction as in the first to third embodiments. Accordingly, even when the side members 1, 3 and the front-rear direction members 17a, 17b of the suspension member 17 which are vehicle-body side structural members receive the impact load from the front side, there is no risk of the load transmission members 25 hindering axial crush deformation, and the vehicle-body front structure can have a sufficient performance of absorbing the impact load.

Moreover, the movement trajectory of the vehicle 29 after the interference of the obstacle 27 with the load transmission members 25 is such that the vehicle 29 moves laterally in the vehicle width direction to move away (to get farther) from the obstacle 27 as in the movement trajectory P of FIG. 3. This can reduce interference between the vehicle body and the obstacle 27 as much as possible and prevent entering of the obstacle 27 into the vehicle cabin 15, thereby suppressing deformation of the vehicle cabin 15.

Furthermore, also in the fourth to seventh embodiments, the load transmission members 25 are located between the side member 1 and the front-rear direction member 17a of the suspension member 17 and between the side member 3 and the front-rear direction member 17b of the suspension member 17. Accordingly, in a crash mode of normal frontal crash other than the small overlap crash, the side members 1, 3 and the suspension member 17 are hardly affected by the load transmission members 25 and are crushed and deformed to absorb impact load in much the same way as in a vehicle provided with no load transmission members 25. In other words, also in the fourth to seventh embodiments, there is no risk of the load transmission members 25 hindering the axial crush deformation of the side members 1, 3 in the normal frontal crash, and the vehicle-body front structure can have a sufficient performance of absorbing the impact load.

Although the contact surface 25bs configured to receive the impact load of the obstacle 27 in each of the load transmission members 25 in the fourth to seventh embodiments is a concave curved surface, the contact surface 25bs may have a flat surface shape as in the load transmission members 25 in the first to third embodiments. Moreover, the second load transmission members 41, 41A, 41B, 41C in the fourth to seventh embodiments can be used in combination as appropriate. Moreover, the load transmission members 25, 25A, 25B in the first to third embodiments and the second load transmission members 41, 41A, 41B, 41C in the fourth to seventh embodiments can be used in combination as appropriate.

Although the present invention has been described above by reference to the embodiments and the example, the present invention is not limited to those, and it will be apparent to these skilled in the art that various modifications and improvements can be made. That is, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1, 3 side member (vehicle-body side structural member)
5 power train
17 suspension member
17a, 17b front-rear direction member of suspension member (vehicle-body side structural member)
17c vehicle width direction member of suspension member
18 dash cross member
25, 25A, 25B load transmission member
25bs contact surface of load transmission member (inclined surface, load receiving portion)
27 obstacle
37 connection member to which load transmission member is attached
41, 41A, 41B, 41C second load transmission member
49 strut housing
55 engine mount (mounting member)

The invention claimed is:

1. A vehicle-body front structure comprising:
vehicle-body side structural members extending in a front-rear direction of a vehicle body at both sides of the vehicle body;
a power train arranged between the vehicle-body side structural members at the both sides of the vehicle body; and
a load transmission member attached to at least one of the vehicle-body side structural members or the power train with at least part of the load transmission member located outside the vehicle-body side structural members in a vehicle width direction of the vehicle body, the load transmission member configured to transmit at least part of impact load received from an obstacle in front of the vehicle body to the vehicle body via the power train; and
a second load transmission member provided in a load transmission path from the power train to the vehicle body and provided on the vehicle-body side structural members with a gap between the second load transmission member and the power train.

2. The vehicle-body front structure according to claim 1, wherein the vehicle-body side structural members include side members extending in the front-rear direction, wherein the vehicle-body front structure comprises a dash cross member extending in the vehicle width direction and having end portions in the vehicle width direction bonded to the side members, and
wherein the second load transmission member is located in a vicinity of bonding portions between the side members and the dash cross member.

3. The vehicle-body front structure according to claim 2, wherein the second load transmission member includes side surfaces facing side surfaces of the side members on an engine room side and rear surfaces facing a front surface of the dash cross member on the engine room side.

4. The vehicle-body front structure according to claim 1, wherein the vehicle-body side structural members include a suspension member having a vehicle width direction member extending in the vehicle width direction, and
wherein the second load transmission member is provided at a center of the vehicle width direction member in the vehicle width direction.

5. The vehicle-body front structure according to claim 1, wherein the vehicle-body side structural members include a suspension member having front-rear direction members extending in the front-rear direction and a vehicle width direction member extending in the vehicle width direction, and
wherein the second load transmission member is located in a vicinity of boundary portions between the vehicle width direction member and the front-rear direction members.

6. The vehicle-body front structure according to claim 5, wherein the suspension member has inclined portions in the boundary portions,
wherein the inclined portions continuously connect the front-rear direction members and the vehicle width direction member to each other, and
wherein the second load transmission member is attached to the inclined portions.

7. The vehicle-body front structure according to claim 1, wherein the vehicle-body side structural members include side members,
wherein the power train is attached to the side members via mounting members, and
wherein the second load transmission member is provided on strut housings located in load transmission paths from portions of the power train to the vehicle body, the portions of the power train being portions where the power train is attached to the mounting members.

8. The vehicle-body front structure according to claim 1, wherein the load transmission member with the impact load from outside the vehicle-body side structural member in the vehicle width direction transmits the impact load to the vehicle body via the power train.

9. The vehicle-body front structure according to claim 8, wherein the load transmission member includes a load receiving portion configured to receive the impact load, and
wherein the load receiving portion in contact with the obstacle moves the vehicle body laterally in the vehicle width direction in a direction away from the obstacle.

10. The vehicle-body front structure according to claim 9, wherein the load receiving portion has an inclined surface inclined at an inclination angle such that a rearward portion of the inclined surface in die front-rear direction of the vehicle body is located outside a frontward portion of the inclined surface in the front-rear direction of the vehicle body in the vehicle width direction, and wherein the inclination angle is equal to or smaller than 45° with respect to the front-rear direction of the vehicle body in a plan view in an up-down direction of the vehicle body.

11. The vehicle-body front structure according to claim 1, wherein each of the vehicle-body side structural members includes:
   a side member; and
   a suspension member located below the side member, and
   wherein the load transmission member is arranged between the suspension member and the side member.

12. The vehicle-body front structure according to claim 11, wherein the load transmission member is attached to the suspension member.

13. The vehicle-body front structure according to claim 11, further comprising:
   a connection member connecting the side member and the suspension member to each other,
   wherein the load transmission member is attached to the connection member.

14. The vehicle-body front structure according to claim 11, wherein the load transmission member is attached to the power train.

15. A vehicle-body front structure comprising:
   vehicle-body side structural members extending in a front-rear direction of a vehicle body at both sides of the vehicle body;
   a power train arranged between the vehicle-body side structural members at the both sides of the vehicle body; and
   a load transmission member attached to at least one of the vehicle-body side structural members or the power train with at least part of the load transmission member located outside the vehicle-body side structural members in a vehicle width direction of the vehicle body, the load transmission member configured to transmit at least part of impact load received from an obstacle in front of the vehicle body to the vehicle body via the power train,
   wherein each of the vehicle-body side structural members includes:
      a side member; and
      a suspension member located below the side member, and
      the load transmission member is arranged between the suspension member and the side member.

* * * * *